(12) United States Patent
Haghpassand

(10) Patent No.: US 9,998,471 B2
(45) Date of Patent: Jun. 12, 2018

(54) HIGHLY ACCURATE SECURITY AND FILTERING SOFTWARE

(71) Applicant: Kirsten Aldrich, NY, NY (US)

(72) Inventor: Joshua Haghpassand, NY, NY (US)

(73) Assignee: Kirsten Aldrich, New York, NY (US)

( * ) Notice: Subject to any disclaimer, the term of this patent is extended or adjusted under 35 U.S.C. 154(b) by 0 days. days.

(21) Appl. No.: 14/583,843

(22) Filed: Dec. 29, 2014

(65) Prior Publication Data

US 2015/0113269 A1 Apr. 23, 2015

Related U.S. Application Data

(62) Division of application No. 10/686,694, filed on Oct. 15, 2003, now Pat. No. 8,972,590.

(51) Int. Cl.
*H04L 9/18* (2006.01)
*H04L 29/06* (2006.01)
(Continued)

(52) U.S. Cl.
CPC ............ *H04L 63/101* (2013.01); *G06F 21/50* (2013.01); *H04L 29/06* (2013.01); *H04L 51/063* (2013.01);
(Continued)

(58) Field of Classification Search
CPC ... H04L 63/101; H04L 9/0861; H04L 12/585; H04L 29/06; H04L 51/063; H04L 51/08;
(Continued)

(56) References Cited

U.S. PATENT DOCUMENTS 5,442,699 A * 8/1995 Arnold ................. G11B 23/284
380/1
5,563,946 A * 10/1996 Cooper .................. G06F 21/10
705/52

(Continued)

FOREIGN PATENT DOCUMENTS

EP 1359758 A1 5/2003

OTHER PUBLICATIONS

STIC search strategy (requested Jan. 31, 2018).*
(Continued)

*Primary Examiner* — Sharon Lynch
(74) *Attorney, Agent, or Firm* — Mark M. Friedman

(57) ABSTRACT

A security software comprises administrative module for configuring access levels and creating types of accounts and application server for domain filtering by checking against friendly and unfriendly inbound, outbound and exception lists. Hard filtering either approves, terminates requests or re-routes request without the user's knowledge. Soft filtering passes disapproved requests and sends an e-mail alert to authorized recipients. Content filtering includes checking a content of a requested document against a friendly, unfriendly list and exception list. Hard filtering passes or rejects the requested document. Soft filtering passes the requested document or rejects or approves by highlighting its content. Options include e-mail filtering that checks subject, sender's address and domain against an unfriendly, friendly and exception list. e-mail alert for hard filtering, inbound privacy shield, a pop up blocker, the application server acts as proxy server with proxy chaining capabilities and an encryption function can encrypt part of e-mail message.

21 Claims, 18 Drawing Sheets

(51) Int. Cl.
*G06F 21/50* (2013.01)
*H04L 12/58* (2006.01)
*H04L 29/08* (2006.01)

(52) U.S. Cl.
CPC .............. *H04L 51/08* (2013.01); *H04L 51/12* (2013.01); *H04L 63/0428* (2013.01); *H04L 63/14* (2013.01); *H04L 63/20* (2013.01); *H04L 69/329* (2013.01)

(58) Field of Classification Search
CPC . H04L 51/12; H04L 63/0428; H04L 63/0435; H04L 63/14; H04L 63/20; G06F 21/50
See application file for complete search history.

(56) References Cited

U.S. PATENT DOCUMENTS

| | | | | |
|---|---|---|---|---|
| 5,673,316 A * | 9/1997 | Auerbach | G07F 7/08 | 705/51 |
| 5,917,489 A * | 6/1999 | Thurlow | G06Q 10/107 | 706/45 |
| 5,960,080 A * | 9/1999 | Fahlman | G06F 21/6209 | 380/252 |
| 5,960,086 A * | 9/1999 | Atalla | H04L 9/0891 | 380/260 |
| 6,011,849 A * | 1/2000 | Orrin | H04L 9/065 | 380/37 |
| 6,178,243 B1 * | 1/2001 | Pomerantz | G06F 21/606 | 358/296 |
| 6,976,166 B2 | 12/2005 | Herley et al. | | |
| 7,464,268 B2 * | 12/2008 | Kent, Jr. | G06Q 10/107 | 713/150 |
| 7,552,482 B2 * | 6/2009 | Redlich | G06F 21/6209 | 713/166 |
| 7,703,140 B2 * | 4/2010 | Nath | G06F 21/6218 | 713/165 |
| 7,908,224 B2 * | 3/2011 | Malcolm | G06F 21/606 | 705/64 |
| 7,945,519 B2 * | 5/2011 | Malcolm | G06F 21/606 | 705/64 |
| 7,945,783 B2 * | 5/2011 | Kent, Jr. | G06Q 10/107 | 380/261 |
| 8,126,139 B2 * | 2/2012 | Rose | H04L 9/0637 | 380/28 |
| 8,219,815 B2 * | 7/2012 | Malcolm | G06F 21/606 | 713/170 |
| 8,595,495 B2 * | 11/2013 | Mayer | H04L 12/58 | 709/206 |
| 9,225,553 B2 * | 12/2015 | Malcolm | G06F 21/606 | |
| 2002/0051545 A1 * | 5/2002 | Ogilvie | H04L 9/00 | 380/280 |
| 2002/0073313 A1 * | 6/2002 | Brown | G06F 21/62 | 713/165 |
| 2002/0087479 A1 * | 7/2002 | Malcolm | G06F 21/606 | 705/64 |
| 2002/0091928 A1 * | 7/2002 | Bouchard | H04L 9/3247 | 713/178 |
| 2002/0112015 A1 * | 8/2002 | Haynes | H04L 63/0428 | 709/206 |
| 2002/0143885 A1 * | 10/2002 | Ross, Jr. | G06Q 10/107 | 709/207 |
| 2002/0147661 A1 * | 10/2002 | Hatakama | G06Q 30/06 | 705/26.8 |
| 2002/0169952 A1 * | 11/2002 | DiSanto | H04K 1/00 | 713/150 |
| 2002/0169954 A1 * | 11/2002 | Bandini | G06Q 10/00 | 713/153 |
| 2003/0023176 A1 | 1/2003 | Yonce et al. | | |
| 2003/0051054 A1 * | 3/2003 | Redlich | G06F 21/6209 | 709/246 |
| 2003/0084292 A1 * | 5/2003 | Pierce | G06F 21/606 | 713/168 |
| 2003/0235307 A1 * | 12/2003 | Miyamoto | H04L 9/002 | 380/269 |
| 2004/0030893 A1 * | 2/2004 | Karamchedu | G06F 21/606 | 713/168 |
| 2004/0039908 A1 * | 2/2004 | Rose | H04L 9/0637 | 713/168 |
| 2004/0078334 A1 * | 4/2004 | Malcolm | G06F 21/606 | 705/50 |
| 2004/0078596 A1 * | 4/2004 | Kent, Jr. | G06Q 10/107 | 713/160 |
| 2004/0117456 A1 * | 6/2004 | Brooks | H04L 12/58 | 709/217 |
| 2004/0139334 A1 * | 7/2004 | Wiseman | G06F 21/51 | 713/188 |
| 2004/0153515 A1 * | 8/2004 | Touboul | G06Q 10/107 | 709/206 |
| 2004/0193871 A1 * | 9/2004 | Seshadri | H04L 63/0428 | 713/154 |
| 2004/0199596 A1 * | 10/2004 | Nutkis | G06F 21/6245 | 709/207 |
| 2004/0249892 A1 * | 12/2004 | Barriga | H04L 12/583 | 709/206 |
| 2005/0021987 A1 * | 1/2005 | Cahill | G06F 21/10 | 713/193 |
| 2005/0038750 A1 * | 2/2005 | Cahill | G06F 21/10 | 705/59 |
| 2005/0114664 A1 * | 5/2005 | Davin | H04L 9/12 | 713/170 |
| 2006/0005034 A1 * | 1/2006 | Willman | G06F 21/575 | 713/182 |
| 2006/0075228 A1 * | 4/2006 | Black | H04L 63/0428 | 713/167 |
| 2007/0172066 A1 * | 7/2007 | Davin | H04L 9/12 | 380/262 |
| 2009/0049296 A1 * | 2/2009 | Kent, Jr. | G06Q 10/107 | 713/160 |
| 2010/0002870 A1 * | 1/2010 | Rose | H04L 9/0637 | 380/28 |
| 2013/0067225 A1 * | 3/2013 | Shochet | G06F 21/6209 | 713/165 |

OTHER PUBLICATIONS

Partial Encryption of Compressed Images and Videos, Howard Cheng and Xiaobo Li, Department of Computing Science, University of Alberta Edmonton, IEEE Transactions on Signal Processing, vol. 48, No. 8, Aug. 2000.

Partial Encryption of Compressed Video, Reena R. Ambekar, Harsh R. Bhagtani, Lavalesh M. Gupta, Priya N. Nichani, Tushar P. Borad, IJRET: International Journal of Research in Engineering and Technology, ISSN: 2319-1163, vol. 2, Issue 4, Apr. 2013.

* cited by examiner

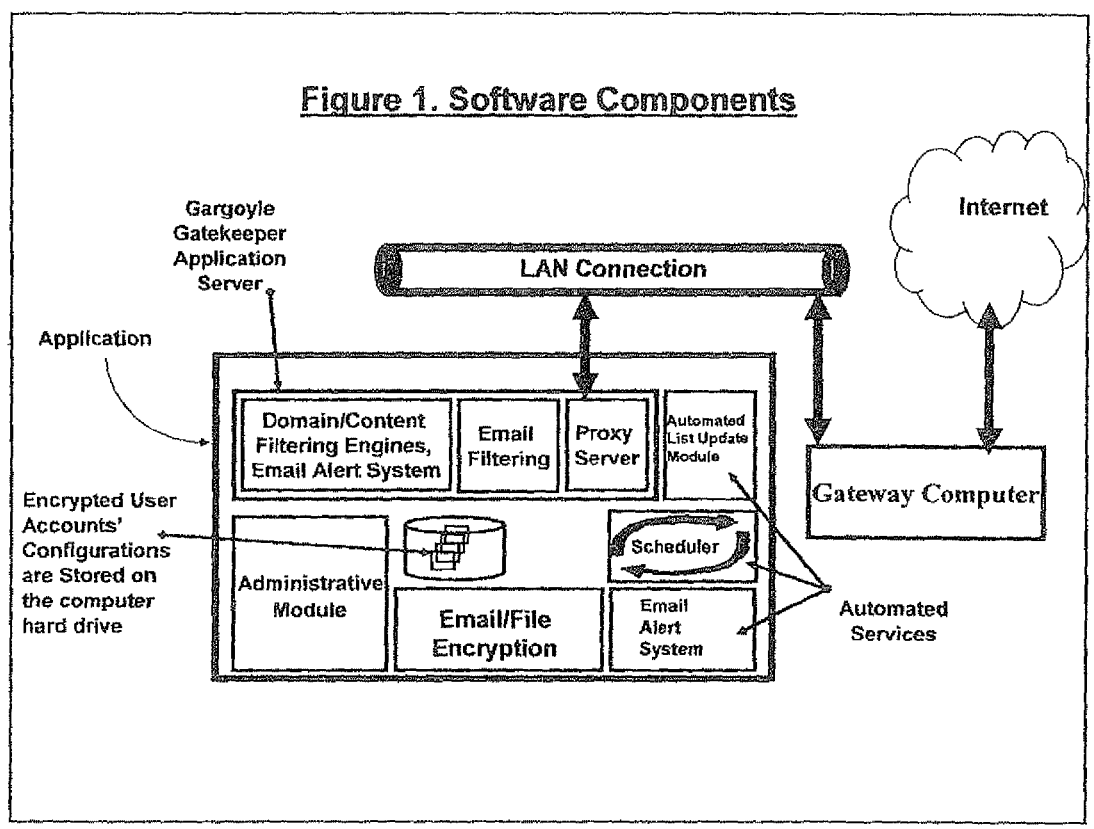

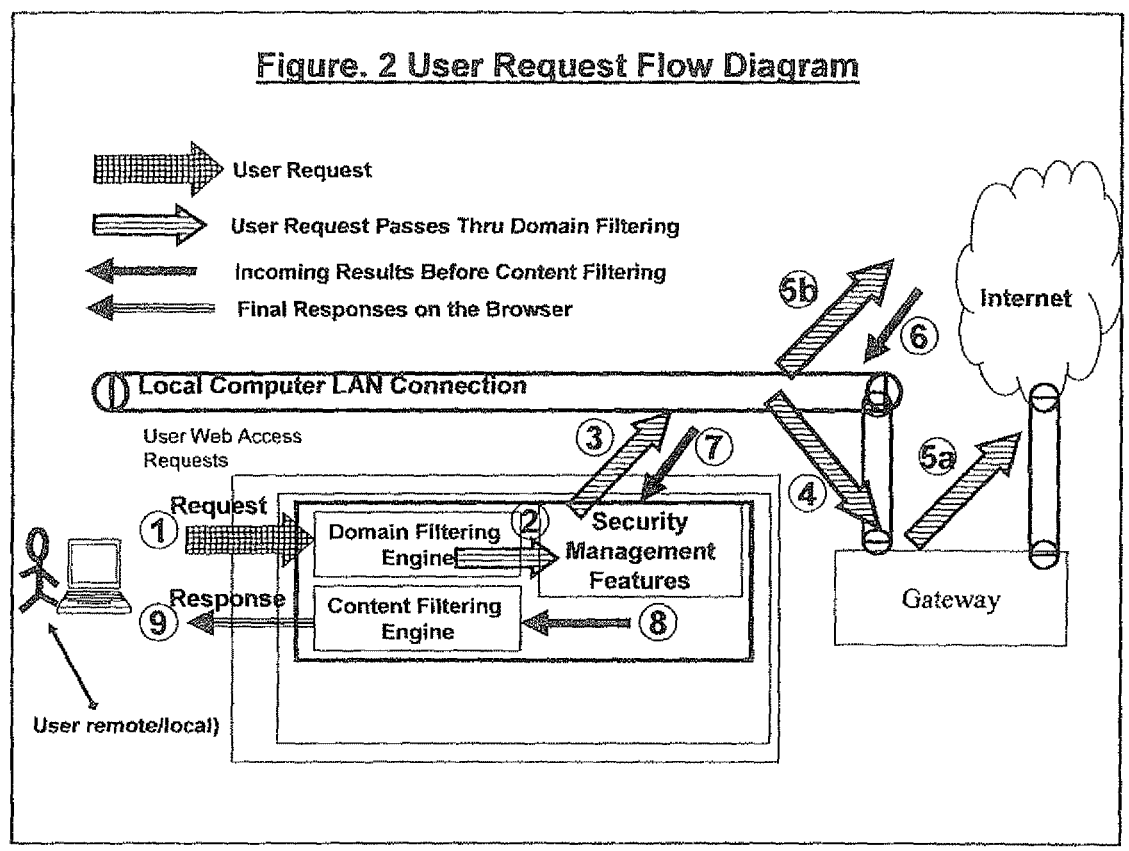

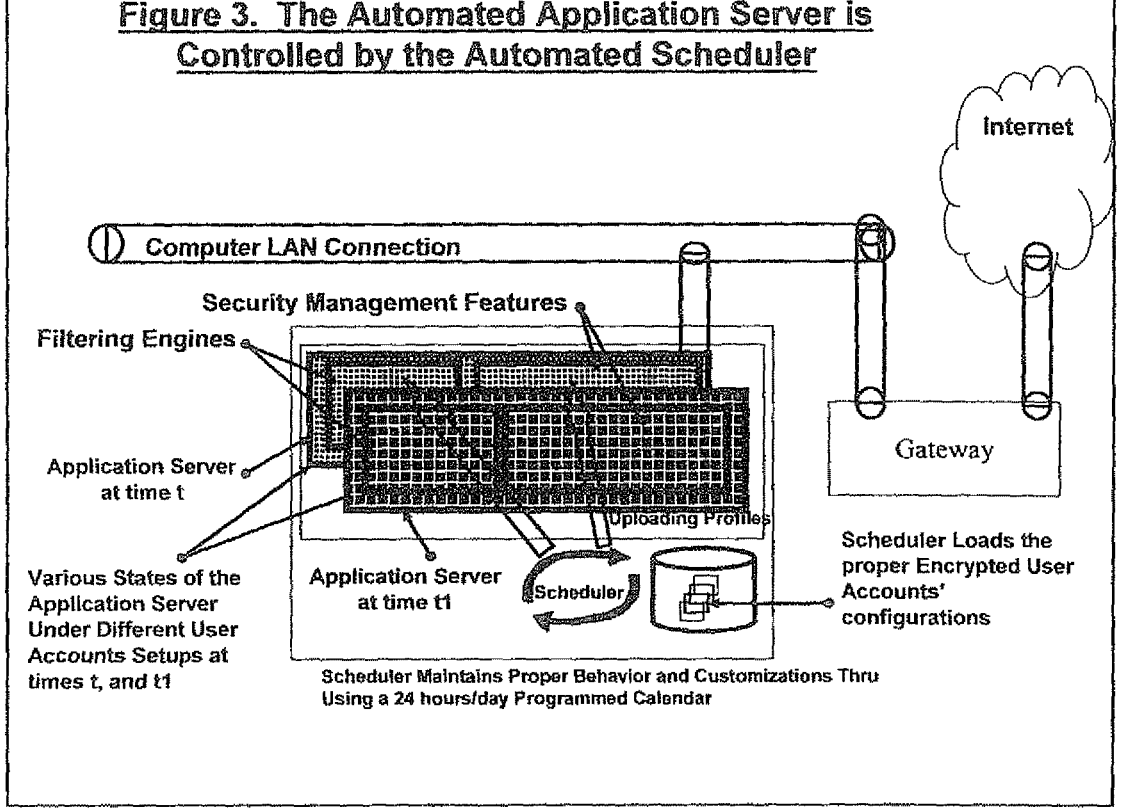

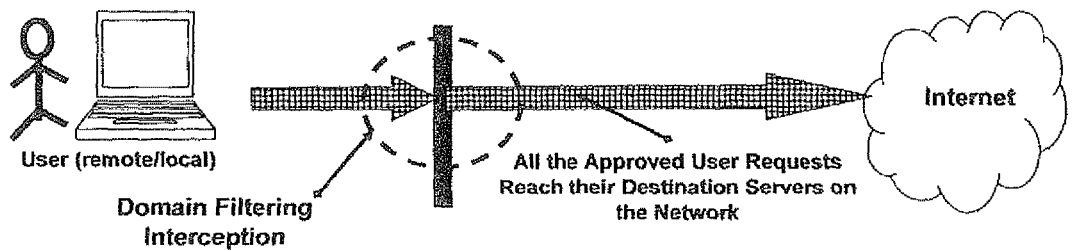

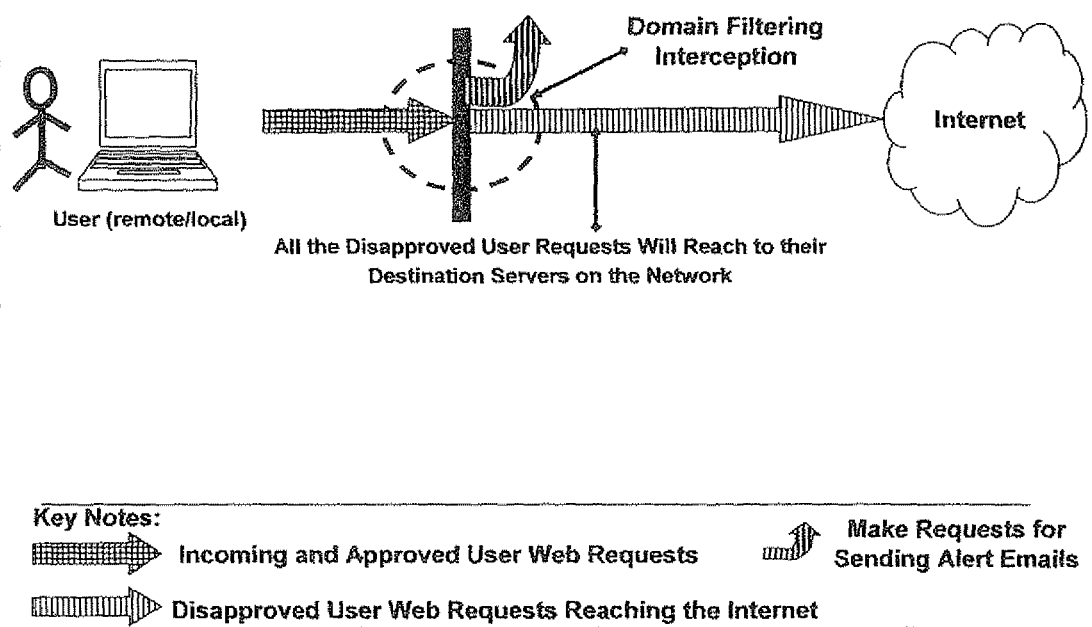

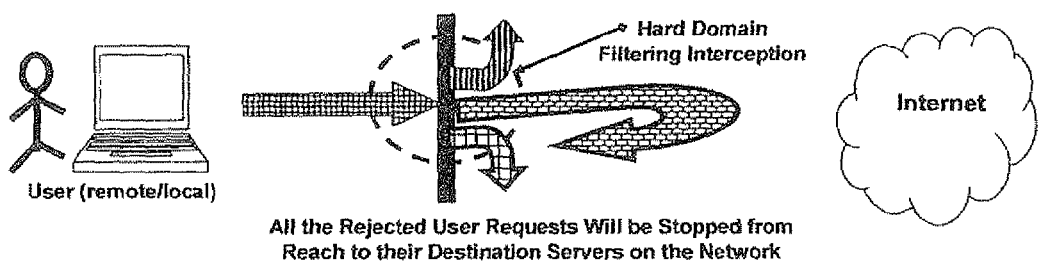

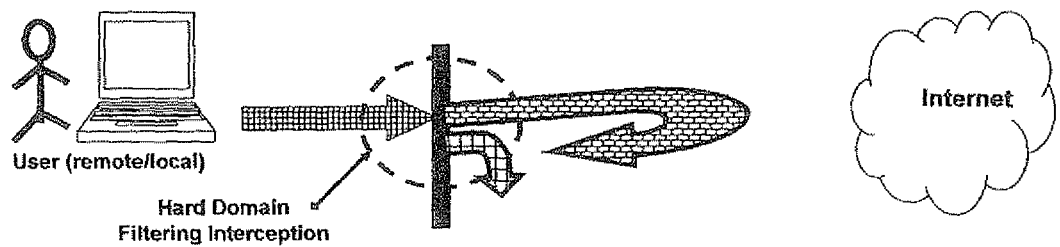
Figure 4D. Hard Domain Filtering— The Disapproved Requests With Optional Re-Route

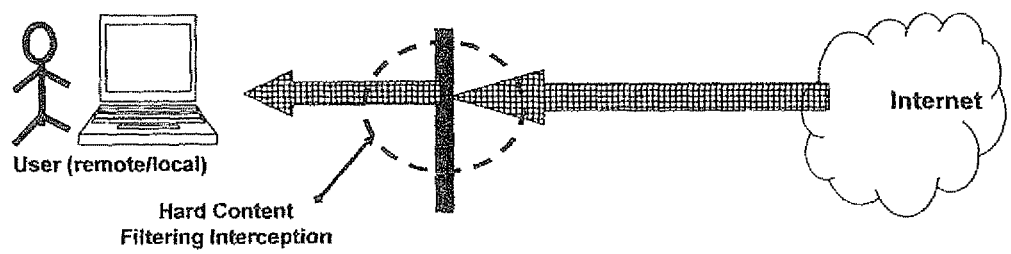

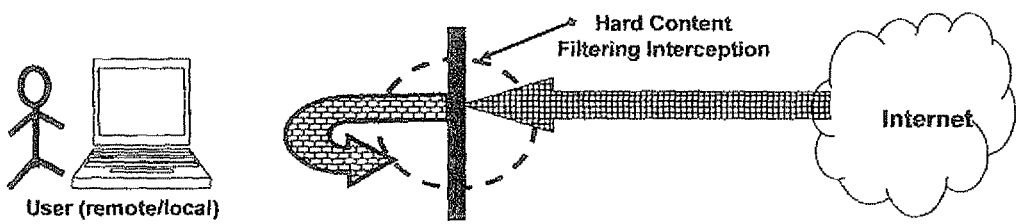

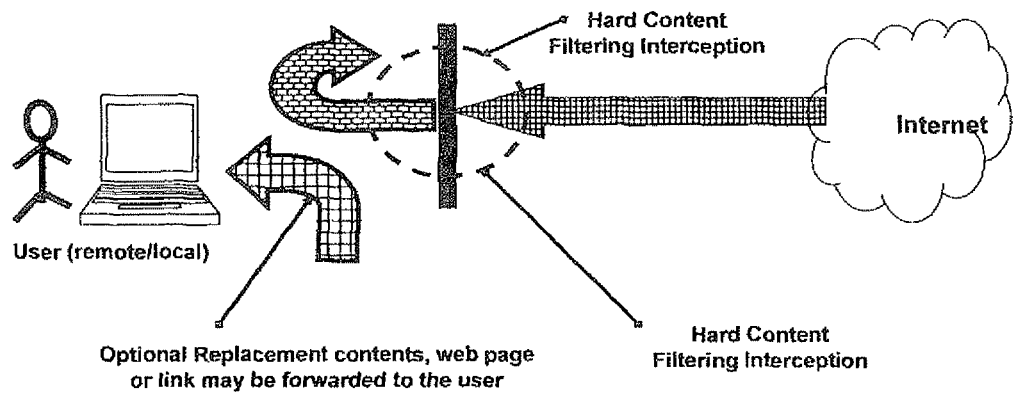

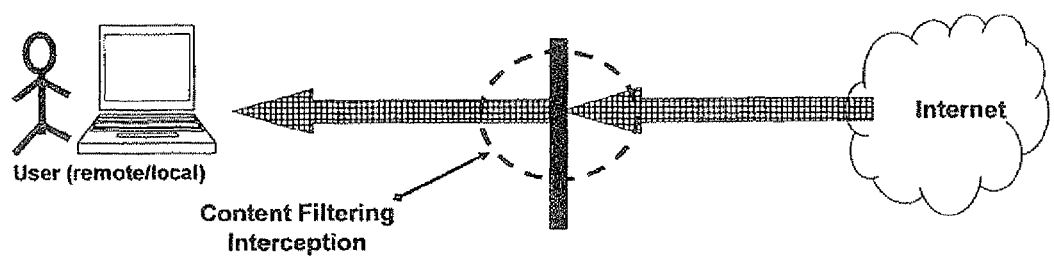

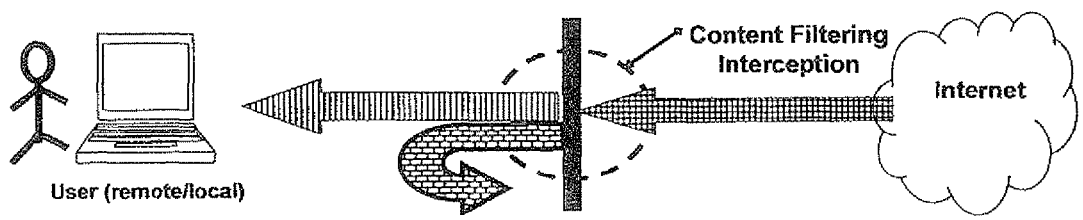
Figure 6B. Soft Content Filtering with Unfriendly Content Lists – The Disapproved Requests
Key Notes:
- Incoming or Approved User Requested Contents and Web Pages
- The Cleaned Requested Contents are Forwarded to the user
- All the Disapproved portions of the User Requested contents will be deleted from the incoming Pages and contents

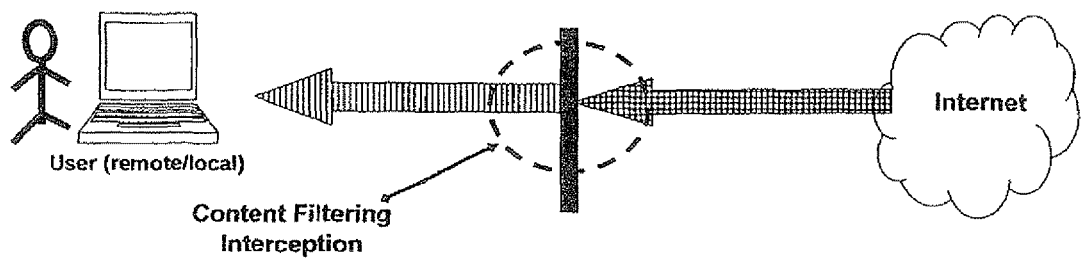

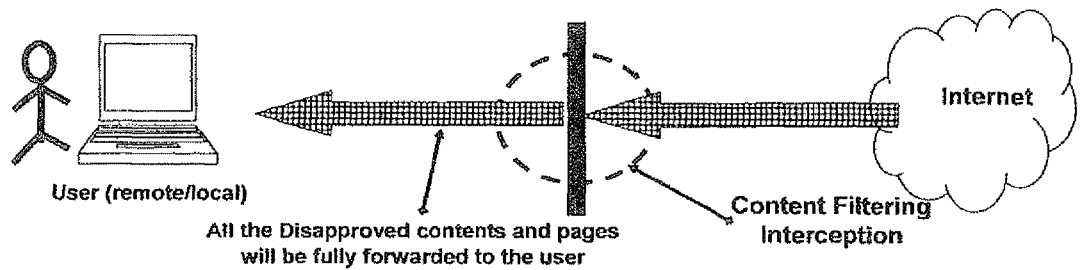

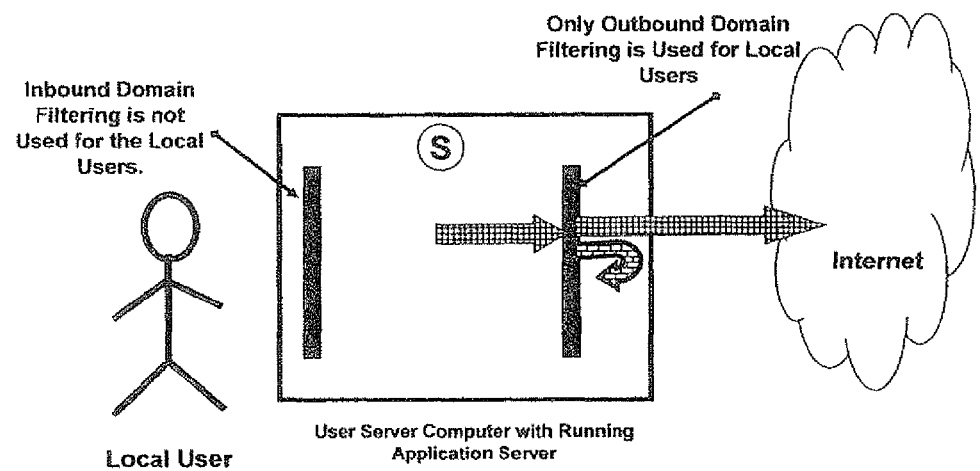

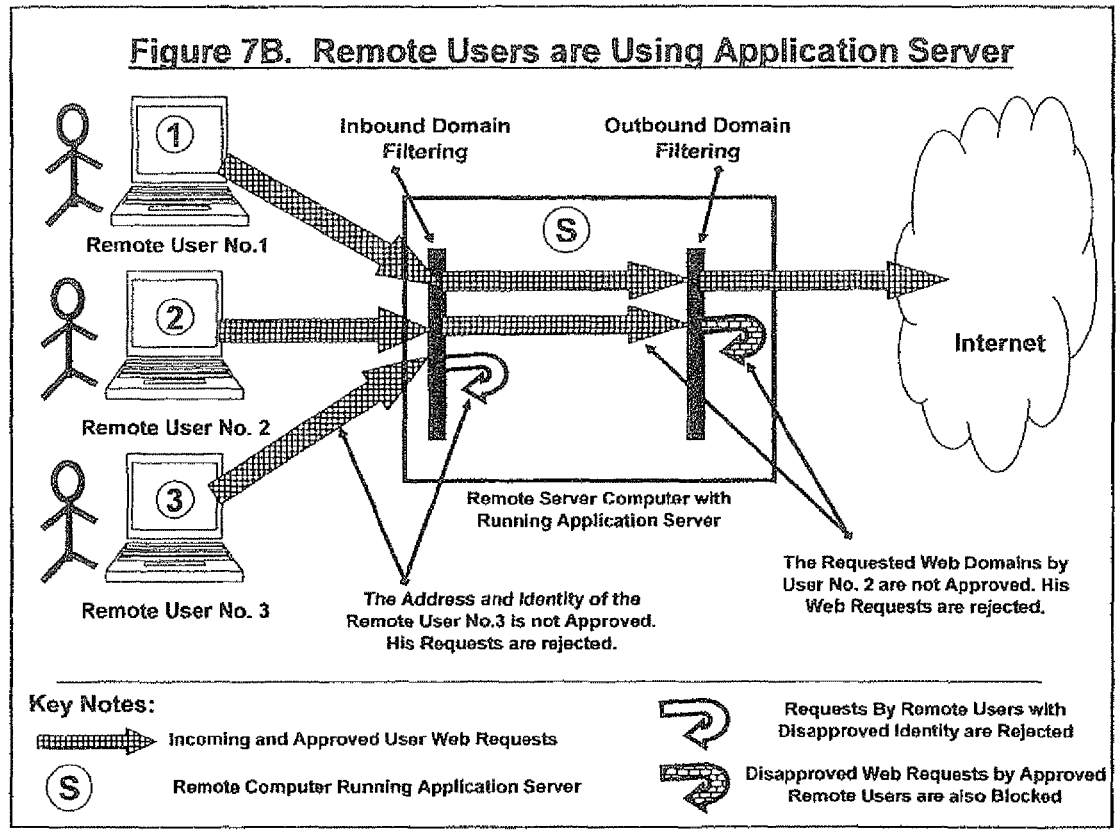

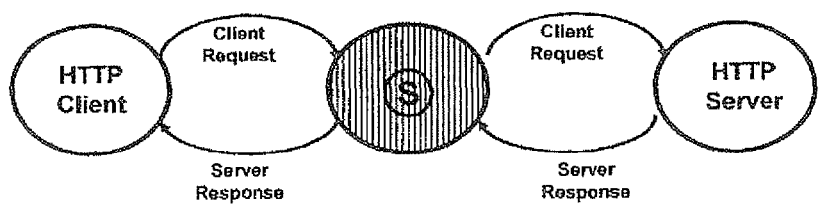
Figure 8A. Using the Application Server in a Simple Network Proxy Server Deployment
Key Notes:
 Application Server Running as a Proxy Server

Figure 8B. Using the Application Server in a Network Proxy Chaining Deployment
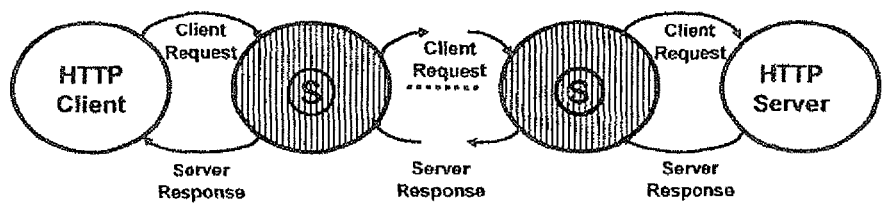
Key Notes:
 Application Server Running as a Proxy Server

HIGHLY ACCURATE SECURITY AND FILTERING SOFTWARE

PRIORITY INFORMATION

This patent application is a continuation-in-part patent application of (a) the presently pending U.S. patent application Ser. No. 09/661,876 ("Web-Based Security and Filtering System with Proxy Chaining") previously filed by Applicant and Inventor Joshua Haghpassand on Sep. 14, 2000 and which is incorporated herein by reference in its entirety

FIELD OF THE INVENTION

The field of this invention is software, and more particularly, highly accurate security and filtering software.

BACKGROUND OF THE INVENTION AND DISCUSSION OF THE PRIOR ART

Currently, access to the Internet and the use of e-mail has created various gaps in security which threaten families, consumers and corporations. Parents and corporations need to properly control the users' access to the disapproved contents and to web sites that are deemed untrustworthy. While there are tools in the market, none have fully resolved the problem. Such tools may excessively filter content and web sites to an extent that they even do not allow the user access to some valuable and useful web sites. This is called the filtering accuracy, and currently, none of the available products can reach to 100% accuracy.

In addition there are other risk factors to the user and corporate data, which may violate the user privacy preferences. For example, the existence of snoopers, eavesdroppers, remote and local intruders, Spyware (software programs and agents are installed on the user computers without their knowledge and act as Trojan horse on the user computers to steal user information, monitor the user behavior and transmit the information to their senders), impersonators (use the computer address for their own use for sending Spam emits or other activities), hijackers (take control of the computer resources for unauthorized use such as providing pornography services for their own clients), computer viruses, and etc., create real threats to the user information and privacy. Some web sites collect the user information and transmit the information unprotected over the wire. This allows the snoopers and eavesdroppers to use such information.

E-mail systems are abused data mining engines and eavesdroppers.

Further, there are factors that create disturbance, and waste valuable resources. This includes email Spams, disrupting advertisement pop-up windows.

Some additional privacy violations are imposed by obtaining the user information from unauthorized users and children. Some web sites even collect very secure information from children.

Additional drawbacks associated with the current systems include the fact that they require significant maintenance and configuration requirements. Since there are no single products that answer all the problems together, the user may need to install several products to reach a fairly successful performance.

SUMMARY OF THE PRESENT INVENTION

The software of the present invention solves these threats and shortcomings. It provides one integrated solution with the additional quality of service and privacy protection. It stops unauthorized users and children to disclose the secured information on the web. It provides a 100% accuracy in a fully web access filtering system that allows parents and corporate to rate the web sites along the trusted and distrusted line, with the additional filtering over the contents that are provided via trusted web sites.

The software of the present invention protects computer user from web sites that violate user privacy, and place Spyware agents on user computers. It protects the computer system against local and remote intruders, where the file system will be securely locked and the contents are securely encrypted. Additionally, it protects the computer resources from unauthorized remote access by only allowing the access to the trusted clients and visitors from the trusted domains and addresses.

The software of the present invention allows email users to stop Spam emails, and protect children and corporate email users from receiving e-mails from distrusted email senders, ISP domains, and with the inappropriate subjects. The software prevents disapproved remote access to the computer for identity impersonations. It allows the remote users to become anonymous on the cyberspace. It allows the local user to become anonymous on the cyberspace with the use of proxy chaining.

The email senders may protect fully or portions of their email messages, and attachments and store or exchange the encryption keys with the email recipients with no electronic storage or transmission requirements. On the other hand, they have the option of also using very complex encryption keys to encrypt their computer file systems. The software of the present invention prevents the computer file system corruption from multiple encryptions by allowing encryption ownership for each file. The person who encrypts a file (without keeping the original copy) in the computer, will also own the file until decrypting the file. No other user on the same computer may be allowed to encrypt the already encrypted file.

This software product allows web users to shut down the embedded 'script language' contents within the page resources. This prevents the use of powerful scripting languages within the web pages from processing user information and transmit them without corporate or parents permission and knowledge.

This software can be used automated, and it can be used as a background service in the operating system. This allows the application server to be launched as an automated service after the computer is turned on (booted up). The automated list update provides a maintenance free system.

This software product supports the user of proxy chaining. This enables the network architects to use the product in various network setups to fully take advantage of its functionalities, and its privacy protection and its security tools.

This software product conforms to all types of Internet connection requirements (DSL, Modem, Cable, LAN), and all the ISP's requirements (Use of 'automated configuration script', or use of external proxy servers), and to all the available browsers in the market.

In sum, the software of the present invention is a security software comprises administrative module for configuring access levels and creating types of accounts and application server for domain filtering by checking against friendly and unfriendly inbound, outbound and exception lists. Hard filtering either approves, terminates requests or re-routes request without the user's knowledge. Soft filtering passes approved and disapproved requests, but when passing disapproved requests and queries, an e-mail alert is sent to authorized recipients.

Content filtering includes checking a content of a requested document against a friendly, unfriendly list and exception list. Hard filtering against a friendly list passes or rejects the requested document. Soft filtering against a friendly list passes the requested document if it rejects the content. If the soft filtering approves the content then it highlights the content. Options include e-mail filtering that checks subject, sender's address and domain against an unfriendly, friendly and exception list. e-mail alert for hard filtering, inbound privacy shield, a pop up blocker, the application server acts as proxy server with proxy chaining capabilities. An encryption function can encrypt part of or a full e-mail message, attachment, file or file system.

The software of the present invention is a fully automated and programmable maintenance free filtering and monitoring system capable of using up to 48 different sets of complete and customized operational configurations during a daily operation. As part of automated services used by the domain and content filtering engines and by the automated list update module, an optional e-mail alert allows the software of the present invention to periodically send e-mail messages to the parents or administrator regarding user violations after the queue of the e-mail alert system has accumulated a certain number of such messages that need to be sent. After sending the contents of its queue it cleans the queue. The e-mail alert system also sends an e-mail to the parents or administrator whenever the lists have been updated.

IMPORTANT OBJECTS AND ADVANTAGES

The following objects and advantages of the present invention may appear in one or more embodiments:

(1) to provide a software that filters using exception lists and thereby achieves accuracy up to 100% by preventing over-filtering;

(2) to provide a security and filtering software that includes an encryption function that allows the user at his option to encrypt only a portion of an e-mail message, file or attachment;

(3) to provide a software that includes an encryption function that evades eavesdroppers that employ data mining programs or processes;

(4) to provide a software that includes an encryption function that employs an encryption key that at the option of the user can be either binary and therefore hard to decipher or character text that is hard to obtain since it can be communicated discretely orally;

(5) to provide a security and filtering software that can be used by a remote or local user;

(6) to provide a security and filtering software that can simultaneously halt eavesdroppers, highjackers, intruders and impersonators;

(7) to provide a security and filtering software that performs hard and soft filtering;

(8) to provide a security and filtering software that has the option of blocking unwanted pop-ups;

(9) to provide a security and filtering software that can be used to block spam e-mails;

(10) to provide a security and filtering software that includes e-mail filtering;

(11) to provide a security and filtering software that includes a privacy shield to protect sensitive information;

(12) to provide a filtering and security software that has a domain filtering engine that can provide an optional e-mail alert system for both hard and soft filtering;

(13) to provide a security and filtering software that can block spyware;

(14) to provide a security and filtering software that can perform both content and domain filtering;

(15) to provide a security and filtering software wherein its content filtering can replace a requested document that has been rejected with a replacement document selected by a user;

(16) to provide a security and filtering software that allows a user to enhance searching capabilities by placing the searched item into his friendly content list and highlight the "hits";

(17) to provide a security and filtering software that can support unlimited numbers of password protected user accounts with the complete support of personalization;

(18) to provide a security and filtering software including an automated scheduler that supports 48 different account types during a single day,

(19) to provide a security and filtering software that includes an automated application launcher that is also programmable by the parents or administrator,

(20) to provide a security and filtering software that includes an automated list updater,

(21) to provide a security and filtering software that has a range of access levels from maximum 100% access to full suspension,

(22) to provide a security and filtering software that supports anonymous users in manual mode,

(23) to provide a security and filtering software that includes an application server that can act externally as a proxy server or as a chain of proxy servers,

(24) to provide a security and filtering software whose administrative module can configure an automated configuration script file for accessing the Internet,

(25) to provide a security and filtering software that includes e-mail filtering in which disapproved incoming e-mail can be deleted from a user e-mail inbox or optionally remain in the inbox but be inaccessible,

(26) to provide a security and filtering software in which the automated scheduler can shut down access to the world wide web during certain hours,

(27) to provide a security and filtering software that is ideal for helping parents control their children's access to the world wide web,

(28) to provide a security and filtering software that automatically updates the friendly and unfriendly user domain lists and is therefore maintenance free,

(29) to provide a security and filtering software wherein the user for filtering purposes can use his own private list, a network list or hybrid of the two,

(30) to provide a security and filtering software that can be used on all types of Internet connections such as DSL, modem, cable and LAN connections,

(31) to provide a security and filtering software that works with all types of web browsers that are available on the market, and

(32) to provide a security and filtering software that corporations and parents can use to get notifications (e-mail alerts) advising them about a pattern of behavior without actually directly affecting the pattern of behavior, such as when their employees or grown-up children visit disapproved web sites or view disapproved contents.

BRIEF DESCRIPTION OF THE DRAWINGS

FIG. 1 shows the overall software of the present invention in the context of a network;

FIG. 2 shows the flow of user requests (in the direction of numbers "1" through "9") through the filtering engines and security management features of the software of the present invention;

FIG. 3 shows the application server controlled by the automated scheduler which loads in different user accounts at different times;

FIG. 4A shows either soft filtering or hard filtering by the domain filtering engine of the software of the present invention approving a request;

FIG. 4B shows soft filtering by the domain filtering engine disapproving a request including a mandatory e-mail alert;

FIG. 4C shows hard filtering by the domain filtering engine disapproving a request; including optional e-mail alert;

FIG. 4D shows hard filtering by the domain filtering engine disapproving a request;

FIG. 5A shows hard filtering by the content filtering engine approving a request;

FIG. 5B shows hard filtering by the content filtering engine disapproving a request;

FIG. 5C shows hard filtering by the content filtering engine disapproving a request with an optional replacement document;

FIG. 6A shows soft filtering by the content filtering engine against unfriendly list approving a request;

FIG. 6B shows soft filtering by the content filtering engine against unfriendly list disapproving a request and passing a remainder to the user;

FIG. 6C shows soft filtering by the content filtering engine against friendly list approving a request and highlights components found in the friendly list;

FIG. 6D shows soft filtering by the content filtering engine against friendly list disapproving a request and passes the entire document;

FIG. 7A shows a local user with the software of the present invention;

FIG. 7B shows the software of the present invention used remotely by multiple users FIG. 8A is a flow diagram showing the application server acting externally as a single proxy server; and FIG. 8B is a flow diagram showing the application server acting externally in a proxy chaining deployment with multiple instances of the software sequentially connected.

DETAILED DESCRIPTION OF THE PREFERRED EMBODIMENT

The present invention is a versatile customizable security and filtering software 10 that can be installed on a computer and be used by a remote user who obtains anonymity on a global telecommunications network or by a local user. Alternative embodiments of the software can be used by local users only. The software 10 includes an administrative module 20 and an application server 30. The application server 30 includes both a domain filtering engine 40 and a content filtering engine 50. In certain embodiments, the application server does not include a domain filtering engine.

Software 10 includes an administrative module 20 that a user interacts with for creating user accounts and configuring those user accounts, and for configuring automated services. The administrative module 20 accepts user inputs for configuration settings for inbound communications and for outbound communications, and has list maintenance functions that include list editing, list deleting, searching of lists, saving of lists, proxy chaining routing, adding and deleting users, interchanging lists and importing and exporting lists.

It is noted that any list mentioned herein can be empty.

The administrative module 20 interfaces with the application server via the configuration files and to the e-mail encryption system, as more fully described below. Administrative module 20 is used to configure a range of user access levels and can create three types of user accounts that have unique user names and passwords for each user account including (1) an administrator account that is self-configuring and that controls automated services and selects for each account hard filtering or soft filtering, (2) regular accounts with administrative privileges other than the privilege to create additional accounts, view information on any other accounts or configure automated services and (3) regular accounts without administrative privileges. In addition module 20 can create a fourth type of user account namely one anonymous guest user account to be used in a manual launch of the software by general users who have no system-based user name or password.

The administrative module stores as encrypted files on hardware memory the configurations of the range of access levels for the user accounts created and the configurations of the automated services. The range of access levels ranges from maximum 100% access to full suspension. As explained below, the automated scheduler can shut down access to the world wide web by shutting down the proxy server. On the other hand, it can use various user accounts with a whole range of limitations. For example, if a user's unfriendly list is empty, there is no limitation on access to any domain on the world wide web.

The administrative module 20 is also capable of configuring an automated configuration script file for accessing the global telecommunications network. This use of automated configuration script conforms to similar configurations on the user browser.

Application server 30 includes a domain filtering engine 40 that is capable of using from the encrypted files a friendly outbound list and an unfriendly outbound list only one of which is active at any given time and an outbound exception list, and is capable of using a friendly inbound list and an unfriendly inbound list only one of which is active at any given time, and a domain inbound exception list. The friendly outbound list, the unfriendly outbound list, the friendly inbound list, the unfriendly inbound list, the outbound exception list, the domain inbound exception list, the friendly e-mail list and the unfriendly e-mail list are uniquely configured for each user account.

The domain filtering engine 40 is capable of registering the request in a logfile of all web sites requested by a user and capable of performing domain filtering.

Domain filtering engine 40 for inbound requests checks the identity of a requesting remote client against the friendly inbound or unfriendly inbound list and domain inbound exception list maintained in the encrypted files. Similarly, for outbound requests domain filtering engine 40 checks local user and remote user requested domains, URLs and links against the friendly outbound list, unfriendly outbound list and outbound exception list. Then with respect to both inbound and outbound requests if the user has elected to have the domain filtering engine perform 40 hard filtering unless it is overruled by the outbound exception list or domain inbound exception list (which can only happen if it is rejected by an unfriendly list or approved by a friendly list) it either approves the request, terminates the request or re-routes the terminated request without the knowledge of the user. If the user has elected to have the domain filtering engine 40 perform soft filtering then unless overruled by the outbound exception list or domain inbound exception list (which can only happen if it is rejected by an unfriendly list or approved by a friendly list) it passes disapproved requests and periodically sends an e-mail alert to authorized recipients regarding the disapproved request after a certain amount of time.

The domain filtering engine also has an optional e-mail alert component or system for hard filtering and for soft filtering. Periodically, the e-mail alert component sends the e-mail alerts that have accumulated in its queue during the time period to parents or other administrative users regarding the users' access violations, time of the violation, web address attempted to be accessed and the user name. The e-mail alert contains the user-violated domain names, the date of violation and the user name. The e-mail alert system then cleans its queue.

With respect to domain filtering, inbound communications are arranged so that an actual location of a highly sensitive resource is located in an unpublished location that is a replacement location to which requests rejected by the application server are rerouted, wherein approved users are listed in the application server in the unfriendly inbound list and are sent by the application server to the replacement location, and wherein unapproved users are not listed in the unfriendly inbound list and have their request sent to a published address that contains harmless information.

Content filtering engine 50 is capable of performing content filtering which includes checking a content of a requested document against a friendly content inbound list, an unfriendly content inbound list, and a content exception list taken from the encrypted files. The friendly content inbound list, the unfriendly content inbound list and the content exception list being uniquely configured by each user. Only one of the friendly content inbound list and the unfriendly content inbound list is active at any given time.

It should be noted that for each engine, namely the domain filtering engine 40 and the content filtering engine 50 the user can select whether he wishes hard filtering or soft filtering. The term "requested document" as used herein refers to a web page (for example in HTML or XML format) on the world wide web that a user seeks to access or documents downloaded from a web link.

For hard filtering against the unfriendly content inbound list the content filtering engine 50 either passes the requested document if the content of the requested document is not on the unfriendly content inbound list or, unless overruled by the content exception list, rejects the requested document if the content of the requested document is on the unfriendly content inbound list. For hard filtering against the friendly content inbound list the content filtering engine 50 either, unless overruled by the content exception list, passes the requested document if the content of the requested document is on the friendly content inbound list or rejects the requested document if the content of the requested document is not on the friendly content inbound list. The content filtering engine, when performing hard filtering, can also replace a requested document that has been rejected with a replacement document selected by a user of the administrator account If the user has selected soft filtering for the content filtering engine, then if the content filtering engine 50 is checking the content of the requested document against the unfriendly content inbound list it either approves the content of the requested document and passes the full requested document if the content is not on the unfriendly content inbound list or, if the content is on the unfriendly content inbound list then, unless overruled by the content exception list, rejects the content of the requested document and passes a remainder of the requested document. For soft filtering against the friendly content inbound list the content filtering engine 50 either, unless overruled by the content exception list, passes the full requested document if the content is not on the friendly content inbound list or passes the full requested document and highlights the content of the requested document if the content is on the friendly content inbound list Content filtering engine 50 also includes an e-mail filtering component that checks a subject, a sender's address and a sender's domain against an unfriendly e-mail list, a friendly e-mail list and an e-mail exception list. For e-mail filtering software 10 includes an option of hard e-mail filtering in which an incoming disapproved e-mail is deleted from a user e-mail inbox and includes an option for soft filtering in which an incoming disapproved e-mail remains in the user e-mail inbox but is inaccessible to the user.

Application server 30 acts internally to communicate with the domain filtering engine 40 and with the content filtering engine 50. Application server 30 also acts externally as a proxy server that receives requests from HTTP clients, forwards the requests to servers, receives a server response and forwards the server response to the HTTP clients. Alternatively, application server 30, instead of acting externally as a proxy server, acts externally in the context of a deployment of a chain of proxy servers (multiple instances of the software are sequentially interconnected). The chain of proxy servers include at least a first proxy server that receives requests from HTTP clients and forwards the requests through a zero or more intermediary proxy servers to a last proxy server, the last proxy server forwarding the requests to servers, and wherein the last proxy server receives a server response and forwards the server response through the zero or more intermediary proxy servers back to the first proxy server, which first proxy server forwards the server response to HTTP clients. As shown in FIG. 8B the series of dots under the phrase "Client request" in the middle of the FIG. 8B means that between zero and "N" intermediate proxy servers may exist between the first and the last proxy servers. One of the proxy servers in the proxy chaining deployment should be an application server running as a proxy server.

Domain filtering engine 40 and content filtering engine 50 each also have a privacy shield. Domain filtering engine 40 has an outbound privacy shield for blocking disapproved character strings representing confidential information. The administrative user, parent or corporation determines the information that is critical to the business or family and should not be disclosed on-line. An example is a social security, date of birth, address, family names, etc. The content filtering engine's 50 inbound privacy shield component blocks scripting language functions for particular user accounts.

Content filtering engine 50 also includes a pop up blocker as an option. The incoming web page's source language is cleaned with respect to any syntax language that would otherwise activate a pop-up window. The user activates this feature by just clicking on a check box.

Software includes an automated scheduler that starts the application server, stops the application server, reloads new user accounts and re-starts the application server continuously. It can also stop the application server to shut down the user's access to the world wide web. The automated scheduler thus controls a launching of the application server automatically and decides which user account to activate.

Software 10 also includes an automated list update module that updates the friendly inbound list, the unfriendly inbound list, the friendly outbound list and the unfriendly outbound lists for each user account from links on the web. The e-mail alert system also sends e-mail alerts to parents and administrators upon the occasions of a successful update by the automated list update module or its failure to successfully update as scheduled (besides the alerts on the occasion of user domain filtering violations, as discussed previously).

In general, the software 10 always automatically uses domain filtering. It cannot be turned off although it can be de-activated simply by using unfriendly inbound and unfriendly outbound lists and keeping them empty. Content filtering, as with all other components except domain filtering, on the other hand can be turned off.

Software 10 has a special encryption utility that can evade data mining programs. The administrative module 20 includes an editor. The editor includes an editing pane. The editor also includes an encryption function that generates one or more secret symmetric encryption keys in two different formats—character text and binary, each having particular advantages. For example, the binary is harder to decipher and the character text is harder to transmit. The one or more encryption keys are uniquely associated with a text inputted by a user in the editing pane. The encryption component or function is capable of encrypting at the user's option all or only a portion of an e-mail message and all or only a portion of an e-mail message attachment file. The encryption function is also capable of encrypting all or a combination of files on a hard drive local to the software. The binary key is very good for encrypting files on a hard drive, which protects against intrusion attack.

By encrypting only a minimal portion of an e-mail message or its attachment file or a combination of files, the data mining engines are evaded since such engines have recognition tools that recognize the main or most prevalent text that appears in a file or message. Accordingly, when the data mining engine sees that most of the text of the e-mail message, the e-mail attachment file or the combination of files are not encrypted, the data mining engine does not signal that the message or file(s) is something it does not understand since it may be encrypted. On the other hand, since it in fact does not understand the small portion that was encrypted, it ignores that small portion.

Although the invention has been described in detail in the foregoing specification and accompanying drawings with respect to various embodiments thereof, these are intended to be illustrative only and not limiting. One skilled in the art will recognize that various modifications and variations may be made therein which are within the spirit and principles of the invention and the scope of the appended claims. It is not desired to limit the invention to the exact description and operation shown and described. The spirit and scope of this invention are limited only by the spirit and scope of the following claims.

What is claimed is:

1. A non-transitory computer-readable medium having stored thereon an encryption software, the software executed by one or more computers, the execution of the encryption software by the one or more computers performing:
   receiving a selection of a user by automatically accessing user account configurations that were previously configured by the user and that are stored on one or more storage devices accessible to the one or more computers, the selection defining a selected portion of any email message distributed over a computer network by telecommunications, the selected portion to be encrypted, the selected portion being less than half of a text of the email message and configured to allow the email message to escape recognition as an encrypted email message by data mining engines that use a recognition tool to eavesdrop on an email message and signal after finding an amount of unrecognizable text or encrypted text in the eavesdropped email message that satisfies the recognition tool, the selected portion being a same from one email message to another email message with respect to at least a part of a particular user account configuration of the user account configurations;
   utilizing an encryption utility to generate one or more encryption keys that are uniquely associated with the selected portion of the email message to be encrypted; and
   the encryption utility encrypting, using the one or more encryption keys, only the selected portion of the email message,
   the encryption utility configured to encrypt the selected portion of the email message prior to distribution of the email message over the computer network such that the email message escapes recognition as an encrypted email message by the data mining engines.

2. The encryption software of claim 1, wherein the selected portion of the email message excludes a main text of the email message, said main text defined by a recognition tool of a data mining engine that the encryption software is configured to evade.

3. The encryption software of claim 1, wherein the selected portion of the email message excludes a most prevalent text of the email message, said most prevalent text defined by a recognition tool of a data mining engine that the encryption software is configured to evade.

4. The encryption software of claim 1, wherein the execution of the encryption software by the one or more computers also performs
   utilizing the encryption utility to generate one or more encryption keys in character text format.

5. The encryption software of claim 1, wherein the execution of the encryption software by the one or more computers also performs
   utilizing the encryption utility to generate one or more the one or more encryption keys in binary format.

6. The encryption software of claim 1, wherein the execution of the encryption software by the one or more computers also performs
   creating user accounts and configuring those user accounts by an administrative module that the user interacts with.

7. The encryption software of claim 1, wherein the execution of the encryption software by the one or more computers also performs:
   the module receiving the selection of the user, the selection defining which portion of a file or which portion of each file in a combination of files is for encrypting; and
   the utility encrypting only the defined portion of the file or the selected portion of each file in the combination of files.

8. The encryption software of claim 7, wherein the defined portion of the file or the selected portion of each file in the combination of files, constitutes less than half of the file or less than half of each file in the combination of files.

9. The non-transitory computer-readable medium of claim 1, wherein the one or more encryption keys are symmetric.

10. The non-transitory computer-readable medium of claim 1, wherein the amount of unrecognizable text or encrypted text in the eavesdropped email message that satisfies the recognition tool is half or more than half of an email message.

11. A non-transitory computer-readable medium having stored thereon an encryption software, the software executed by one or more computers, the execution of the encryption software by the one or more computers performing:
   receiving a selection of a user by automatically accessing user account configurations that were previously configured by the user and that are stored on one or more storage devices accessible to the one or more computers, the selection defining a selected portion of an attachment to any email message distributed over a computer network by telecommunications, the selected portion to be encrypted, the selected portion being less than half of the attachment and configured to allow the attachment to the email message to escape recognition as an encrypted email attachment by intercepting engines that use a recognition tool to eavesdrop on an email attachment and signal after finding an amount of unrecognizable text or encrypted text in the eavesdropped email attachment that satisfies the recognition tool, the selected portion being a same from one email attachment to another email attachment with respect to at least a part of a particular user account configuration of the user account configurations;
   utilizing an encryption utility to generate one or more encryption keys that are uniquely associated with the selected portion of the attachment to be encrypted; and
   the encryption utility encrypting, using the one or more encryption keys, only the selected portion of the attachment,
   the encryption utility configured to encrypt the selected portion of the attachment to the email message prior to distribution of the email message over the computer network such that the attachment escapes recognition as an encrypted email attachment by the intercepting engines.

12. The encryption software of claim 11, wherein the selected portion of the attachment excludes a main text of the attachment, said main text defined by a recognition tool of the intercepting engines that the encryption software is configured to evade.

13. The encryption software of claim 11, wherein the selected portion of the attachment excludes a most prevalent text of the attachment, said most prevalent text defined by a recognition tool of the intercepting engines that the encryption software is configured to evade.

14. The encryption software of claim 11, wherein the execution of the encryption software by the one or more computers also performs
   utilizing the encryption utility to generate the one or more encryption keys in character text format.

15. The encryption software of claim 11, wherein the execution of the encryption software by the one or more computers also performs
   utilizing the encryption utility to generate the one or more encryption keys in binary format.

16. The encryption software of claim 11, wherein the execution of the encryption software by the one or more computers also performs
   creating user accounts and configuring those user accounts by an administrative module that the user interacts with.

17. The encryption software of claim 11, wherein the execution of the encryption software by the one or more computers also performs:
   the module receiving the selection of the user, the selection defining which portion of a file on at least one storage device or which portion of each file in a combination of files on at least one storage device is for encrypting; and
   the utility encrypting only the defined portion of the file or the defined portion of each file in the combination of files.

18. The encryption software of claim 17, wherein the defined portion of the file or the defined portion of each file in the combination of files, constitutes less than half of the file or less than half of each file in the combination of files.

19. The encryption software of claim 11, wherein use of the encryption software on a computer results in prevention of further use of the computer to further encrypt an already encrypted portion of the attachment.

20. The non-transitory computer-readable medium of claim 11, wherein the one or more encryption keys are symmetric.

21. The non-transitory computer-readable medium of claim 11, wherein the amount of unrecognizable text or encrypted text in the eavesdropped email message that satisfies the recognition tool is half or more than half of an email message.

* * * * *